United States Patent
Diab

(10) Patent No.: US 8,930,726 B2
(45) Date of Patent: Jan. 6, 2015

(54) PHYSICAL LAYER DEVICE AUTO-ADJUSTMENT BASED ON POWER OVER ETHERNET MAGNETIC HEATING

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 210 days.

(21) Appl. No.: 13/535,469

(22) Filed: Jun. 28, 2012

(65) Prior Publication Data

US 2013/0339765 A1    Dec. 19, 2013

Related U.S. Application Data

(60) Provisional application No. 61/658,996, filed on Jun. 13, 2012.

(51) Int. Cl.
*H02H 7/00* (2006.01)
*H04L 1/00* (2006.01)

(52) U.S. Cl.
USPC ............ 713/300; 713/340; 361/1; 361/7; 361/24; 361/93.6

(58) Field of Classification Search
CPC ................. H04L 12/10; H04L 1/0001
USPC ............... 713/300, 340; 361/1, 7, 24, 93.6
See application file for complete search history.

(56) References Cited

U.S. PATENT DOCUMENTS

| 8,588,705 | B1 * | 11/2013 | Tsui et al. ................. 455/69 |
| 2006/0126516 | A1 * | 6/2006 | Lusted et al. ............. 370/241 |
| 2008/0040625 | A1 * | 2/2008 | Vorenkamp et al. ....... 713/340 |
| 2008/0043773 | A1 * | 2/2008 | Ihori .......................... 370/460 |
| 2008/0062590 | A1 * | 3/2008 | Karam ........................ 361/42 |
| 2008/0089512 | A1 * | 4/2008 | Hussain et al. ......... 379/406.01 |
| 2010/0115299 | A1 * | 5/2010 | Darshan ..................... 713/300 |
| 2010/0271227 | A1 * | 10/2010 | Diab et al. ................ 340/657 |

OTHER PUBLICATIONS

European Search Report, Jun. 18, 2014.
TW Office Action, Sep. 15, 2014.

* cited by examiner

*Primary Examiner* — Vincent Tran
(74) *Attorney, Agent, or Firm* — Duane S. Kobayashi

(57) ABSTRACT

Physical layer device auto-adjustment based on power over Ethernet (PoE) magnetic heating. In one embodiment, information generated by a PoE module that is indicative of the PoE operation over the network cable (e.g., level of current, heating, etc.) is made available to the physical layer device (PHY). This information enables the PHY to infer a change in the level of inductance on the line. In response, the PHY can then adjust a characteristic of transmission by the PHY.

19 Claims, 4 Drawing Sheets

PHYSICAL LAYER DEVICE AUTO-ADJUSTMENT BASED ON POWER OVER ETHERNET MAGNETIC HEATING

This application claims priority to provisional patent application No. 61/658,996, filed Jun. 13, 2012, which is incorporated by reference herein, in its entirety, for all purposes.

BACKGROUND

1. Field of the Invention

The present invention relates generally to network powering systems and methods and, more particularly, to a physical layer device auto-adjustment based on power over Ethernet magnetic heating.

2. Introduction

Power over Ethernet (PoE) provides a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In a PoE application such as that described in the IEEE 802.3af (which is now part of the IEEE 802.3 revision and its amendments) and 802.3at specifications, a PSE can deliver power to a PD over multiple wire pairs. In accordance with IEEE 802.3af, a PSE can deliver up to 15.4 W of power to a single PD over two wire pairs. In accordance with IEEE 802.3at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
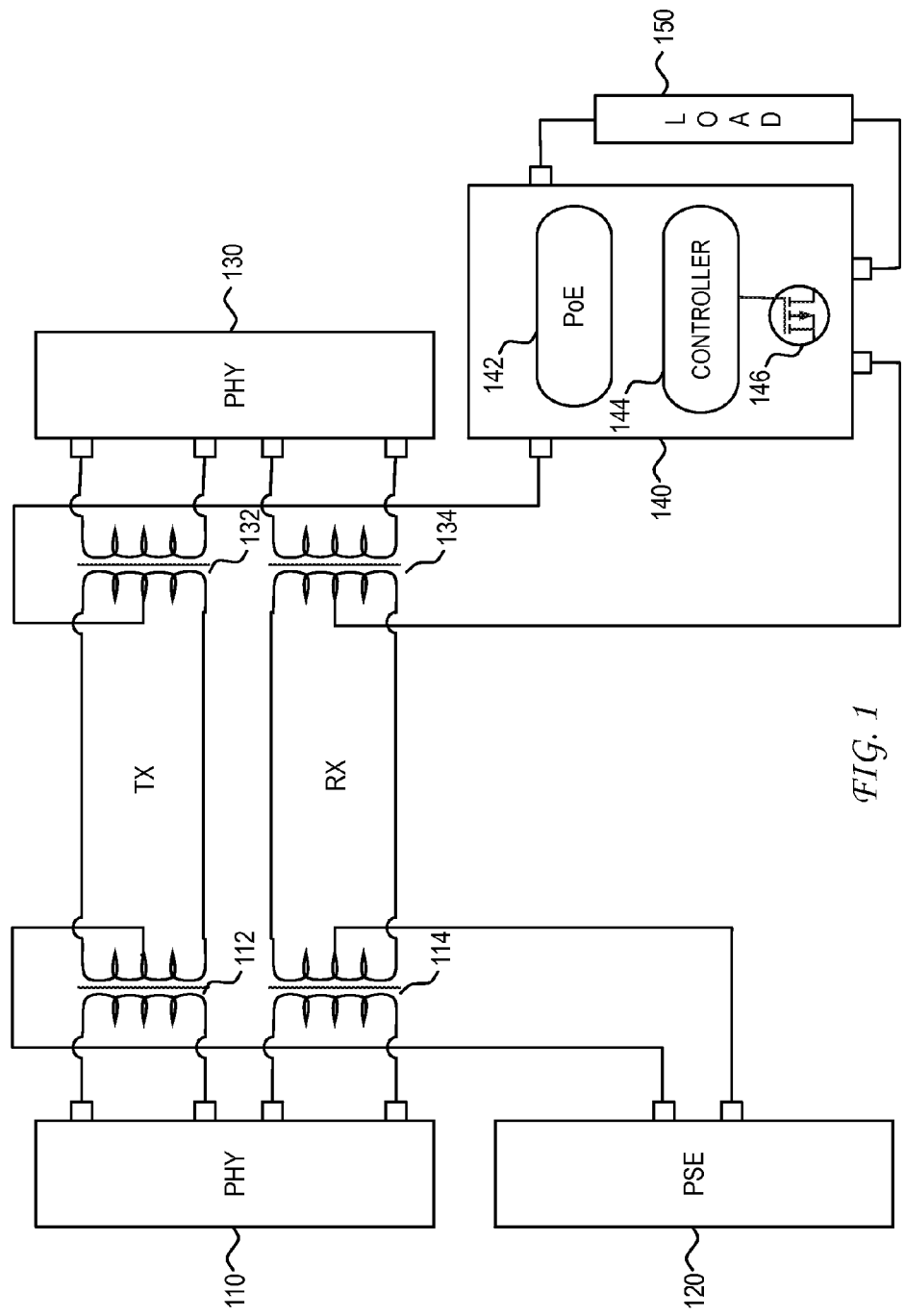
FIG. 1 illustrates an example embodiment of a power over Ethernet system that delivers power over wire pairs used by a data transmission system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Data communication over an Ethernet connection assumes a specific and minimum inductance on the line. At higher frequencies such as that supported by 10GBASE-T, the inductances of the data transformers are much lower to allow for manufacturable magnetics. In a power over Ethernet (PoE) application, current imbalances can arise in the data transformers, which can lead to the existence of a bias current on the data transformers in the PoE current path. With increasing currents being applied to a network cable due to higher-power PoE applications, corresponding reductions in the inductance of the data transformers results. These reductions can lead to increased bit error rates (BERs) for data transmission systems that are sensitive to the levels of inductance on the line.

In one embodiment of the present invention, information generated by a PoE module that is indicative of the PoE operation over the network cable (e.g., level of current, heating, etc.) is made available to the physical layer device (PHY). This information would enable the PHY to infer a change in the level of inductance on the line. In response, the PHY can then adjust a characteristic of transmission by the PHY. In various examples, the PHY can adjust a transmission voltage envelope, a transmission current envelope, a transmission waveform, echo cancellation, or the like.

PoE can be used to deliver power over wire pairs that are used for data transmission. PoE can be applied to various contexts and can be used alongside data transmission standards such as 10BASE-T, 100BASE-TX, 1000BASE-T, 10GBASE-T, 40GBASE-T, or higher data-rate transmission systems. In addition to isolation, the data transformers used can be characterized by an open circuit inductance (OCL).

In the 100BASE-TX specification, the minimum inductance measured at the transmit pins should be greater than or equal to 350 μH with any DC bias current between 0-8 mA injected. In general, the 100BASE-TX specification of a minimal inductance for a data transformer on the transmit side is designed to present sufficient inductance that would overcome killer patterns that cause baseline wander so that the receiver can recover. This specified minimal level of inductance ensures compatibility with PHY receivers that expect to see the effective inductance on the channel such that the signal quality and BER of the link is not impacted.

As the inductance requirement is an implementation-directed approach, newer 1000BASE-T, 10GBASE-T, 40GBASE-T specifications can identify a droop test requirement for the transmitter. The droop test requirement is a signal-characteristic requirement and is related to the OCL of the data transformer. With the droop test requirement, newer PHY implementations (e.g., 1000BASE-T, 10GBASE-T, 40GBASE-T, etc.) have been permitted to use lower inductance data transformers that can satisfy the specified signal characteristics.

In the present invention, it is recognized that the lower inductance data transformers used in newer PHYs can vary significantly depending on the operating condition (e.g., temperature, bias current, etc.) of the data transformer when used to support PoE applications. This is especially true when considering higher-power PoE applications that can support the delivery of near 1 A of power through the data transformers. When such high levels of power are delivered over the wire pairs used for data transmission, the corresponding change in inductance of the data transformers can greatly impact the data transmission system performance.

Prior to describing the details of the present invention, reference is made first to FIG. 1, which illustrates an example embodiment of a PoE system that delivers power over two wire pairs used by a data transmission system. As illustrated, the PoE system includes PSE 110 that transmits power to PD 120 over two wire pairs that would also be used for data transmission. As would be appreciated, PHY specifications such as 1000BASE-T and 10GBASE-T are configured to use four wire pairs. Moreover, some PoE system can be configured to deliver power over four wire pairs. For purposes of illustration, only two wire pairs are shown in FIG. 1 for simplicity.

Power delivered by PSE 110 to PD 120 is provided through the application of a voltage across the center taps of data transformer 112 that is coupled to a transmit (TX) wire pair and data transformer 114 that is coupled to a receive (RX) wire pair carried within an Ethernet cable. On the other end of the network link, power is received by PD 120 through the center taps of data transformer 131 and data transformer 134.

In general, PD 120 can include PoE module 142 that contains the electronics that would enable PD 120 to communicate with PSE 110 in accordance with IEEE 802.3af, 802.3at, legacy PoE transmission, or any other type of PoE transmission. PD 120 also includes controller 144 (e.g., pulse width modulation DC:DC controller) that controls a power transistor 146 (e.g., field effect transistor (FET)), which in turn provides constant power to load 150.

The data communication between PHY 110 and PHY 130 is generally designed to operate with data transformer and/or signal specifications that do not necessarily consider the increasing impact of high levels of powering based on IEEE 802.3at. In particular, the increase of the DC current imbalance in the data transformers due to the delivery of high levels of DC power over the network cable at load currents that can approach 1 A is not considered. In general, the OCL of the data transformers will decrease as the DC bias current through the data transformer increases. Additionally, the OCL of the data transformers will decrease as the temperature of the data transformer increases for a given DC bias current. The impact of the increased DC bias current and increased temperature that can be produced through the application of PoE to a network cable can therefore significantly reduce the OCL of the data transformers. As the PHYs assume a specific and minimum inductance on the line, the decrease in the OCL of the data transformers can lead to increasing BER in the data transmission system.

In the present invention, it is recognized that the data transformers can represent a fixed part of the data transmission system on the printed circuit board. As such, it is a feature of the present invention that the changes in the OCL of the data transformers due to the application of PoE to the relevant wire pairs in a network cable can be compensated for through the adjustment of the transmission operation of the PHY. In one embodiment, the transmission operation of the PHY can be adjusted by modifying the drive strength of the PHY to compensate for the change in OCL of the data transformers. In various examples, the adjustment in drive strength can be characterized by an adjustment to the transmission voltage envelope, the transmission current envelope, the output waveform, or the like. As would be appreciated, the particular mechanism through which the drive strength of the PHY is adjusted would be implementation dependent. Here, the adjustment of the drive strength can be implemented in a manner that would best address a known or inferred change of the inductance on the line. The process of adjustment can also be dependent on the particular mode of operation (e.g., 10BASE-T, 100BASE-TX, 1000BASE-T, 10GBASE-T, 40GBASE-T, etc.) in which the PHYs are operating. In another embodiment, the transmission operation of the PHY can be adjusted by modifying the echo cancellation process.

Figure 2:
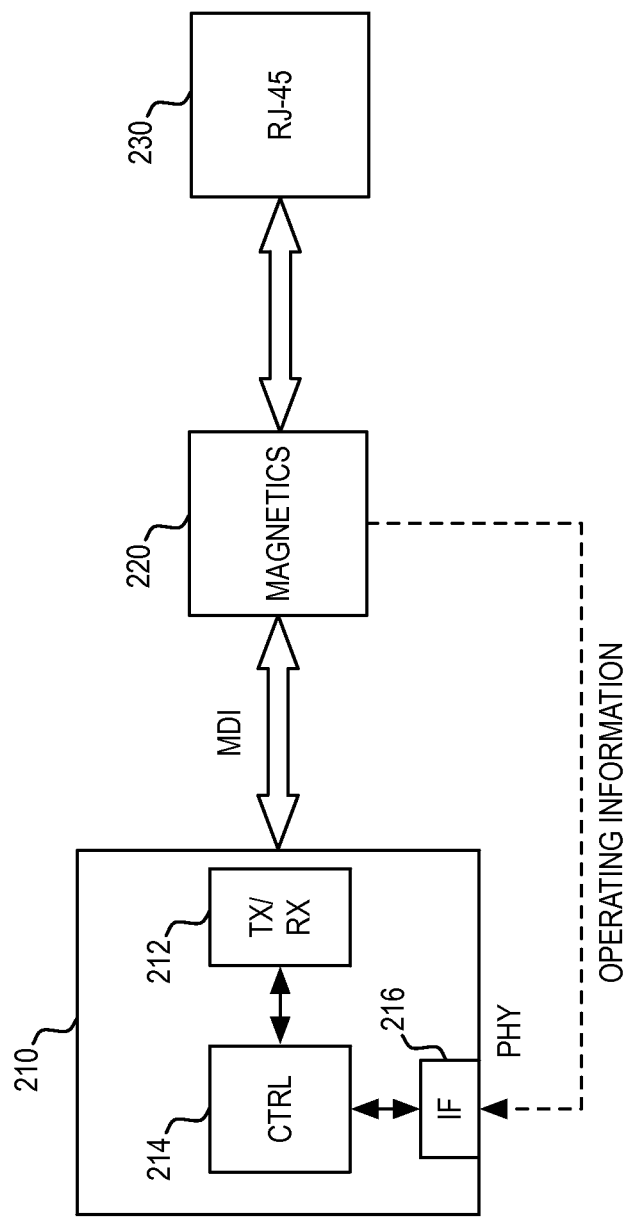
FIG. 2 illustrates an example embodiment of a control mechanism in a physical layer device that is responsive to information reflective of an operating condition of the magnetics.

The adjustment of the transmission operation of the PHY is based on information reflective of the operating condition of the data transformer magnetics. FIG. 2 illustrates an example embodiment of a control mechanism in a PHY that is responsive to such information. As illustrated, PHY 210 is coupled to magnetics 220 via a medium dependent interface (MDI). Magnetics 220 is coupled to RJ-45 connector 230 that facilitates a coupling of PHY 210 to a twisted pair Ethernet cabling transmission medium.

As further illustrated in FIG. 2, PHY 210 includes a transceiver (TX/RX) 212 that transmits and receives data signals via the MDI. The transmission operation of transceiver 212 is controlled by controller 214, which is responsive to operating information received via data interface 216. In general, the operating information is based on an operating condition of magnetics 220 and is used by controller 214 in configuring or otherwise controlling the transmission operation of transceiver 212.

In one embodiment, the operating information can include measurement information reflective of the operating condition of magnetics 220. In one example, the measurement information represents PoE current levels passing through magnetics 220. In another example, the measurement information represents temperature information that can be derived from current measurements, temperature information that is measured using a temperature sensor proximate to magnetics 220, etc. In yet another example, the measurement information can represent inductance information for magnetics 220 that is derived or otherwise measured from operating condition information. In general, the measurement information can represent any information that enables controller 214 to determine a need for a modification of transceiver 212 to compensate for changes in the OCL of magnetics 220.

In another embodiment, the operating information can include operating control signals that are generated in response to the operating condition of magnetics 220. Here, the operating control signals can be generated by a system or module that is external to PHY 210, wherein the operating control signals are provided to PHY 210 via interface 216. In this embodiment, the receipt of the operating control signals via interface 216 would be used by controller 214 in configuring or otherwise controlling the transmission operation of transceiver 212.

As would be appreciated, the particular type of operating information that is provided to PHY 210 can vary. Of significance is that operating information that is derived from an operating condition of magnetics 220 is used by PHY 210 in configuring or otherwise controlling the transmission operation of transceiver 212 to compensate for inductance changes in magnetics 220.

Figure 3:
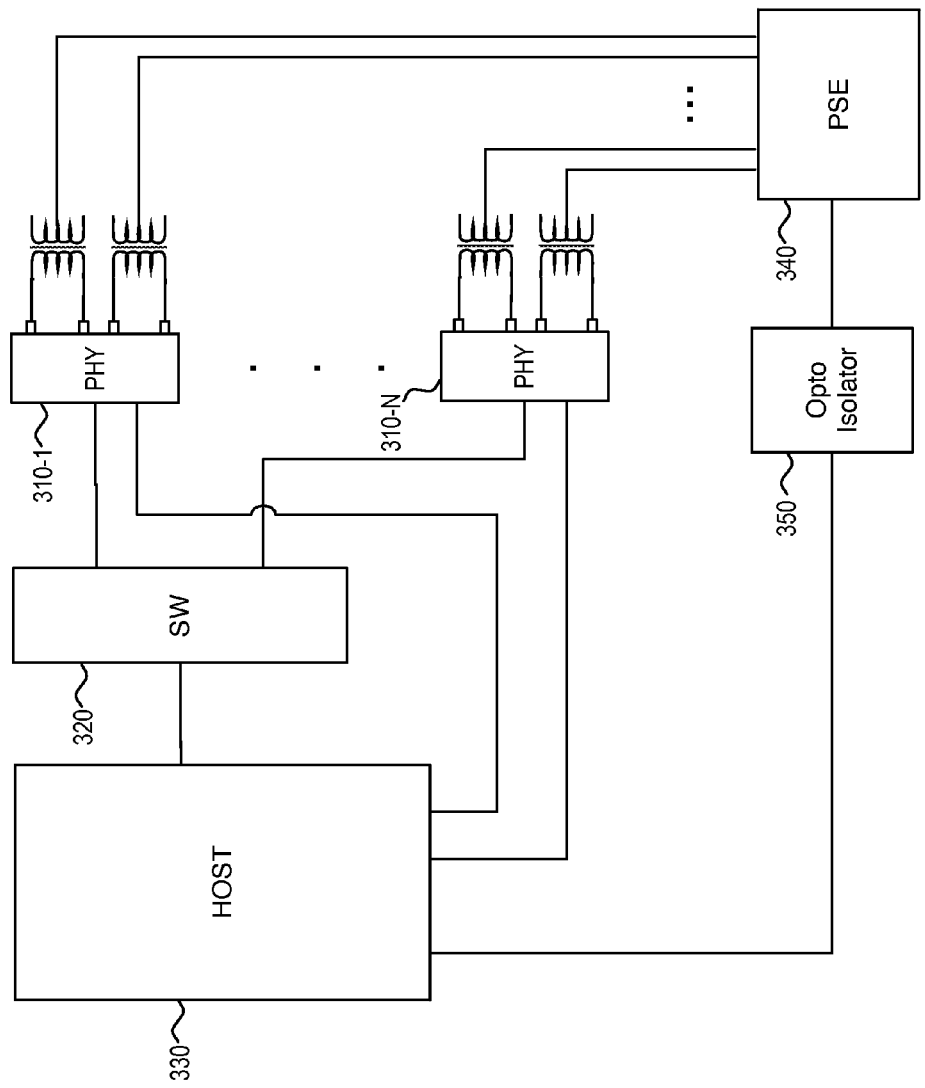
FIG. 3 illustrates an example embodiment of communicating operating information between a power over Ethernet module and a data transmission system.

FIG. 3 illustrates an example embodiment of communicating operating information between a power over Ethernet module and a switch. As illustrated, a switch can include PHYs 310-*n* that are each connected to switch (SW) module 320. For clarity of illustration, only a single pair of data transformers is shown as being coupled to each PHY 310-*n*.

Each PHY 310-*n* is also connected to host 330. In one embodiment, host 330 is incorporated along with Ethernet switch 320 and PHYs 310-*n* on a single chip. In another embodiment, Ethernet switch 320 and PHYs 310-*n* are incorporated on a single chip separate from host 330, wherein communication with host 330 is enabled via a serial interface. Also illustrated in FIG. 3 is a PSE 340 that provides power through the center taps of the data transformers. As illustrated, PSE 340 is also coupled to host 330. In one embodiment, PSE 340 is coupled to host 330 via opto-isolator 350 that facilitates an isolation boundary.

In the example embodiment of FIG. 3, PSE 340 can be configured to monitor the operating condition of the data transformers. In one example, PSE 340 can monitor the level of current that is transmitted through the center taps of the data transformers. In another example, PSE 340 can determine the heating of the data transformers based on the current information or through temperature sensors that are located proximate to the data transformers.

The operating information that is measured or otherwise determined by PSE 340 can be provided to host 330. In one example, host 330 can forward the operating information for a data transformer to the associated PHY 310-*n* that is coupled to that data transformer via a data interface between host 330 and PHY 310-*n*. Based on such operating information, the PHY can then determine how to adjust the transceiver to compensate for inductance changes indicated by the forwarded operating information. In another example, host 330 can process the operating information for a data transformer to derive control signals that are usable by the relevant PHY. In this example, the control signal can be delivered to the relevant PHY through the data interface and used by the PHY to adjust the transceiver to compensate for inductance changes. As would be appreciated, the particular type of operating information that is delivered to the PHY would be dependent on the mechanism used to monitor the operating condition of the data transformer, the capabilities of any intervening processing module, and the capabilities of the PHY itself.

Figure 4:
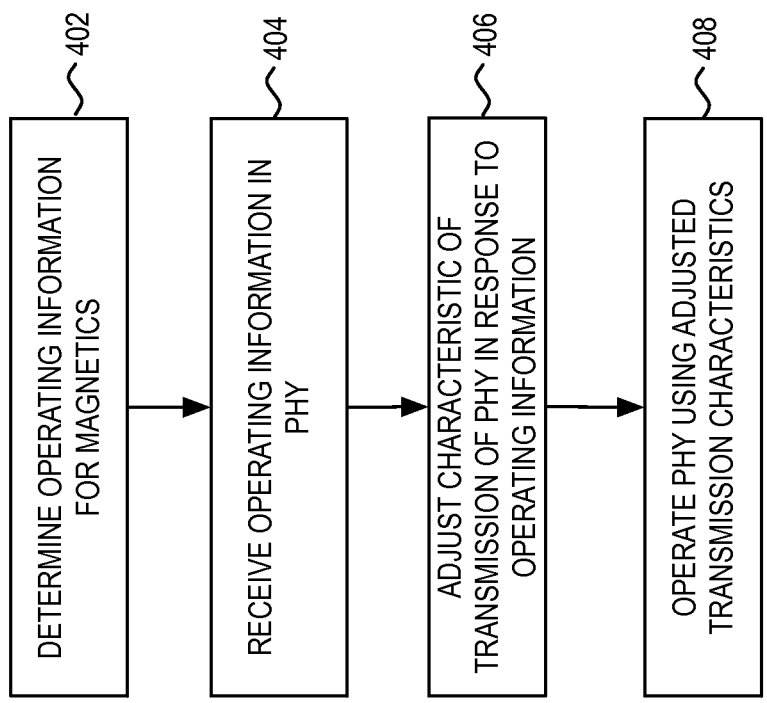
FIG. 4 illustrates a flowchart of an example process according to the present invention.

Having described example embodiments of delivering data transformer operating information to a PHY, reference is now made to the flowchart of FIG. 4, which illustrates an example process according to the present invention. As illustrated, the process begins at step 402 where operating information for the data transformer magnetics are determined at step 402. As described above, the particular mechanism used to determine the operating information can vary depending on the implementation. In the example described above with reference to FIG. 3, a PoE subsystem can be designed to measure or otherwise determine the operating information. The PoE subsystem can then pass the operating information to a host module that can be further configured to determine operating information (e.g., control signals) to be passed to the PHY. Regardless of the particular implementation, operating information is ultimately received by the PHY at step 404.

In response to the received operating information, the PHY can then adjust one or more characteristics of the transmission operation of the PHY at step 406. As would be appreciated, the particular mechanism by which the transmission operation (e.g., change in drive strength, change in echo cancellation, etc.) is modified would be implementation dependent. What is significant is that the identification of a change of inductance in the data transformer due to changes in the bias current, heating, etc. can be used by a PHY to adjust to a change in the inductance in the communication channel.

Here, it should be noted that the changes can be performed at both ends of the channel based on the determined operating information. In one embodiment, the adjustment process can also consider the type of PHY that is on the far-end of the link. For example, where a PHY is coupled to a far-end 100BASE-TX PHY as determined through an auto-negotiation process, local transmission system would know that the far-end data transformers would have an OCL of 350 µH. This knowledge of the baseline OCL of the far-end PHY would be useful in determining adjustments to changes in the inductance of the communication channel. After the particular adjustments are made to the transmission operation of the PHY, operation of the PHY can then commence at step 408. As this operation is designed to compensate for changes in the inductance of the data transformers due to changes in bias current or heating, a lower BER will result.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
  receiving, in a physical layer device, information that is indicative of a level of heating of a data transformer that couples said physical layer device to a twisted wire pair, wherein a center tap of said data transformer is coupled to a power over Ethernet module that facilitates a delivery of power over said twisted wire pair; and
  adjusting a characteristic of transmission by said physical layer device in response to said information that is indicative of a level of heating of said data transformer.

2. The method of claim 1, further comprising determining a change in inductance of a data transformer based on said information that is indicative of a level of heating of a data transformer.

3. The method of claim 1, wherein said information that is indicative of a level of heating of a data transformer is a temperature sensor reading.

4. The method of claim 1, wherein said information that is indicative of a level of heating of a data transformer is a level of current that passes through said data transformer.

5. The method of claim 1, wherein said adjusting comprises adjusting a transmission voltage envelope of said physical layer device.

6. The method of claim 1, wherein said adjusting comprises adjusting a transmission current envelope of said physical layer device.

7. The method of claim 1, wherein said adjusting comprises adjusting a waveform output by said physical layer device.

8. The method of claim 1, wherein said power over Ethernet module is a power source equipment that transmits power over said twisted wire pair.

9. The method of claim 1, wherein said power over Ethernet module is a powered device that receives power over said twisted wire pair.

10. A method, comprising:
  receiving, in a physical layer device, information generated by a power over Ethernet module, the power over Ethernet module controlling a level of current that is transmitted over a plurality of twisted wire pairs that are coupled to the physical layer device via a corresponding plurality of data transformers, the power over Ethernet module coupled to center taps of the plurality of data transformers, wherein the information received by the physical layer device from the power over Ethernet module is indicative of a level of heating of at least one of the plurality of data transformers due to the transmission of the level of current; and adjusting a characteristic of data transmission by the physical layer device in response to the indication of the level of heating of the at least one of the plurality of data transformers due to the transmission of the level of current.

11. The method of claim 10, further comprising determining a change in inductance of the at least one of the plurality of data transformers based on the information generated by the power over Ethernet module.

12. The method of claim 10, wherein the adjusting comprises adjusting a data transmission voltage envelope of the physical layer device.

13. The method of claim 10, wherein the adjusting comprises adjusting a data transmission current envelope of the physical layer device.

14. The method of claim 10, wherein the adjusting comprises adjusting a data transmission waveform output by the physical layer device.

15. A physical layer device, comprising:

an interface that enables the physical layer device to receive information generated by a power over Ethernet module, the power over Ethernet module controlling a level of current that is transmitted over a plurality of twisted wire pairs that are coupled to the physical layer device via a corresponding plurality of data transformers, the power over Ethernet module coupled to center taps of the plurality of data transformers, wherein the information received by the physical layer device from the power over Ethernet module is indicative of a level of heating of at least one of the plurality of data transformers due to the transmission of the level of current; and a controller that adjusts a characteristic of data transmission by the physical layer device in response to the indication of the level of heating of the at least one of the plurality of data transformers due to the transmission of the level of current.

16. The physical layer device of claim 15, wherein the controller adjusts a data transmission voltage envelope of said physical layer device.

17. The physical layer device of claim 15, wherein the controller adjusts a data transmission current envelope of said physical layer device.

18. The physical layer device of claim 15, wherein the controller adjusts a data transmission waveform output by said physical layer device.

19. The physical layer device of claim 15, wherein the controller determines a change in inductance of the at least one of the plurality of data transformers based on the information generated by the power over Ethernet module.

* * * * *